United States Patent [19]
Dyer

[11] Patent Number: 5,098,054
[45] Date of Patent: Mar. 24, 1992

[54] MOUNTING BRACKET FOR A GENERALLY CYLINDRICAL ARTICLE

[75] Inventor: Edward P. Dyer, Germantown, Wis.

[73] Assignee: Tyton Corporation, Milwaukee, Wis.

[21] Appl. No.: 550,322

[22] Filed: Jul. 9, 1990

[51] Int. Cl.⁵ ............................................. F16M 13/00
[52] U.S. Cl. ................................ 248/313; 248/225.1; 248/231
[58] Field of Search ................ 248/313, 316.1, 225.1, 248/316.7, 360, 74.3, 223.4, 231

[56] References Cited

U.S. PATENT DOCUMENTS

| | | | |
|---|---|---|---|
| 2,029,707 | 2/1936 | Dodelin | 248/313 |
| 2,462,375 | 2/1949 | Flaherty | 248/313 X |
| 2,686,032 | 8/1954 | Thorson | 248/313 X |
| 2,873,082 | 2/1959 | Gillespie | 248/316.7 X |
| 3,913,187 | 10/1975 | Okuda | 248/74.3 X |
| 4,609,171 | 9/1986 | Matsui | 248/68.1 X |
| 4,844,396 | 7/1989 | Norton | 248/231 |

FOREIGN PATENT DOCUMENTS 1362547 8/1974 United Kingdom ............ 248/223.4

*Primary Examiner*—Karen J. Chotkowski
*Attorney, Agent, or Firm*—Michael, Best & Friedrich

[57] ABSTRACT

A mounting bracket particularly well-suited for holding a fuel vapor canister on an automobile including, in a one piece molded structure, an adjustable and releasable clamp for engaging the circumference of the canister, sets of stops for engaging the ends of the canister, and a mounting bracket for connecting the clamp to the vehicle.

21 Claims, 2 Drawing Sheets

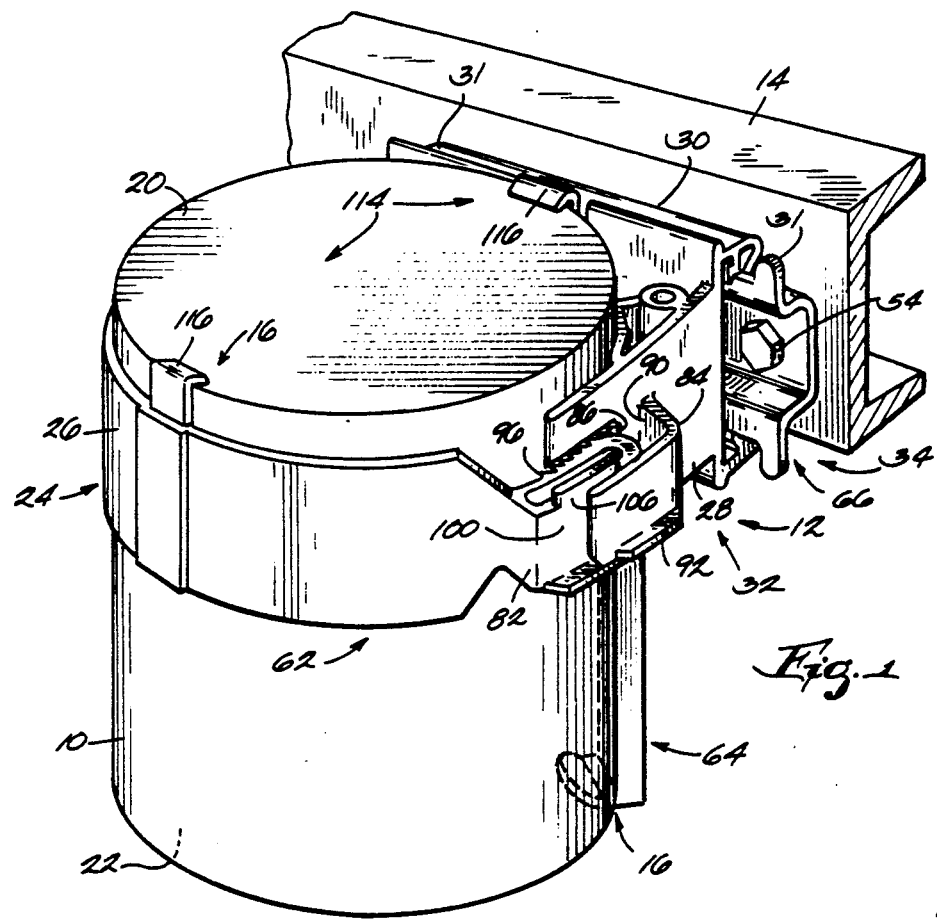
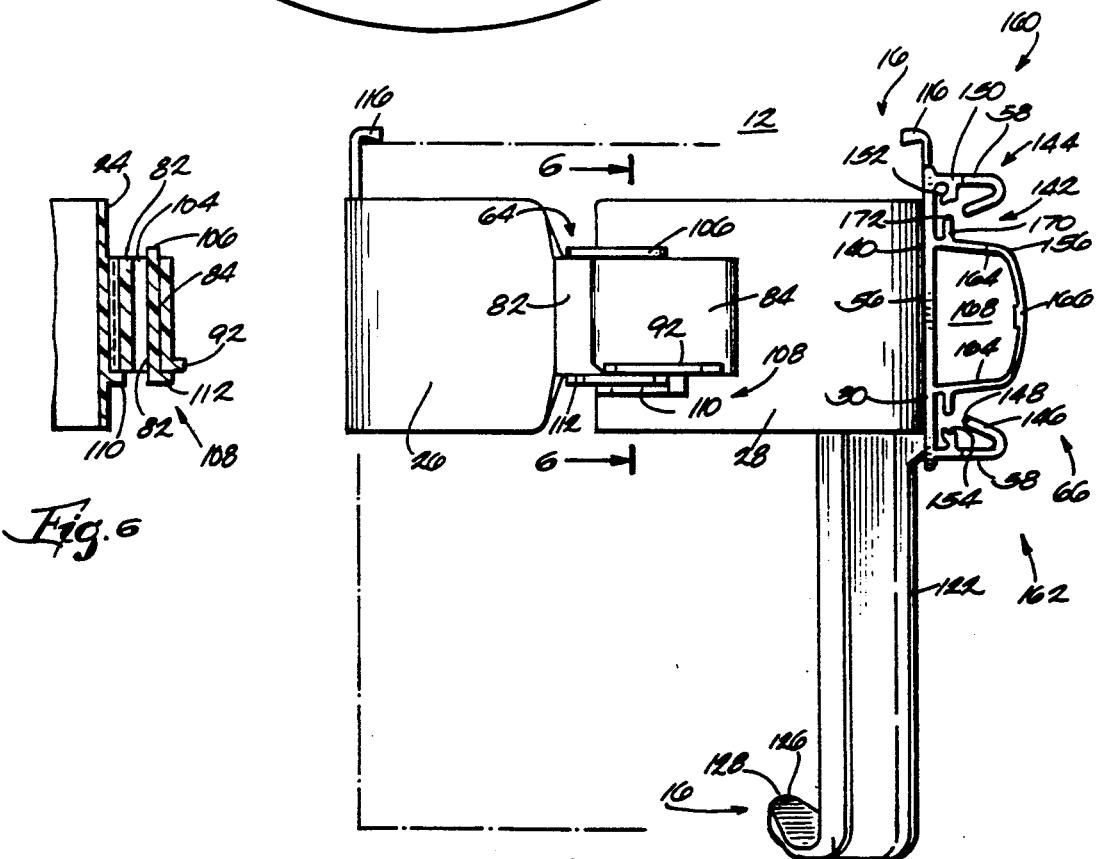

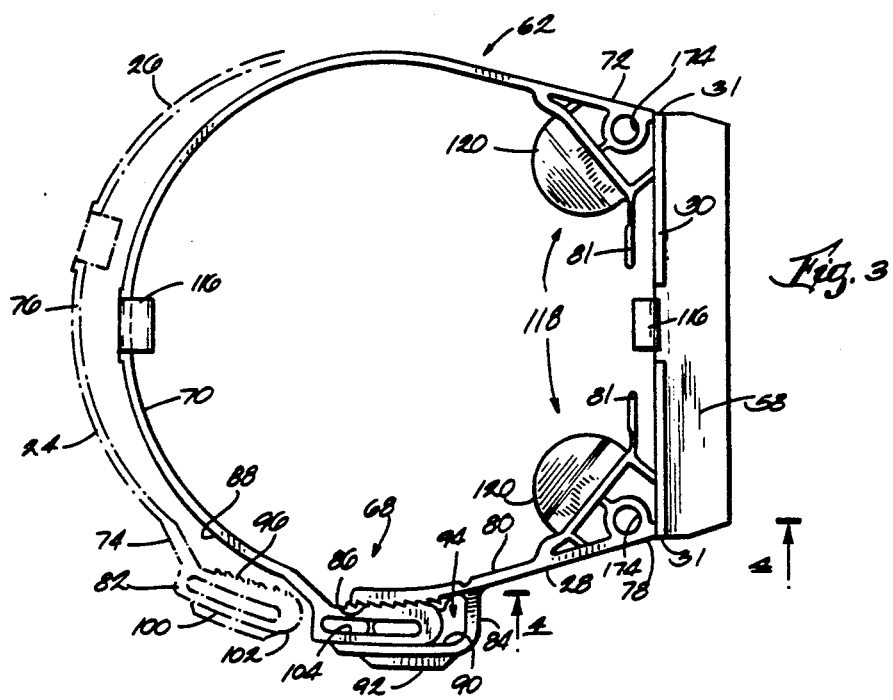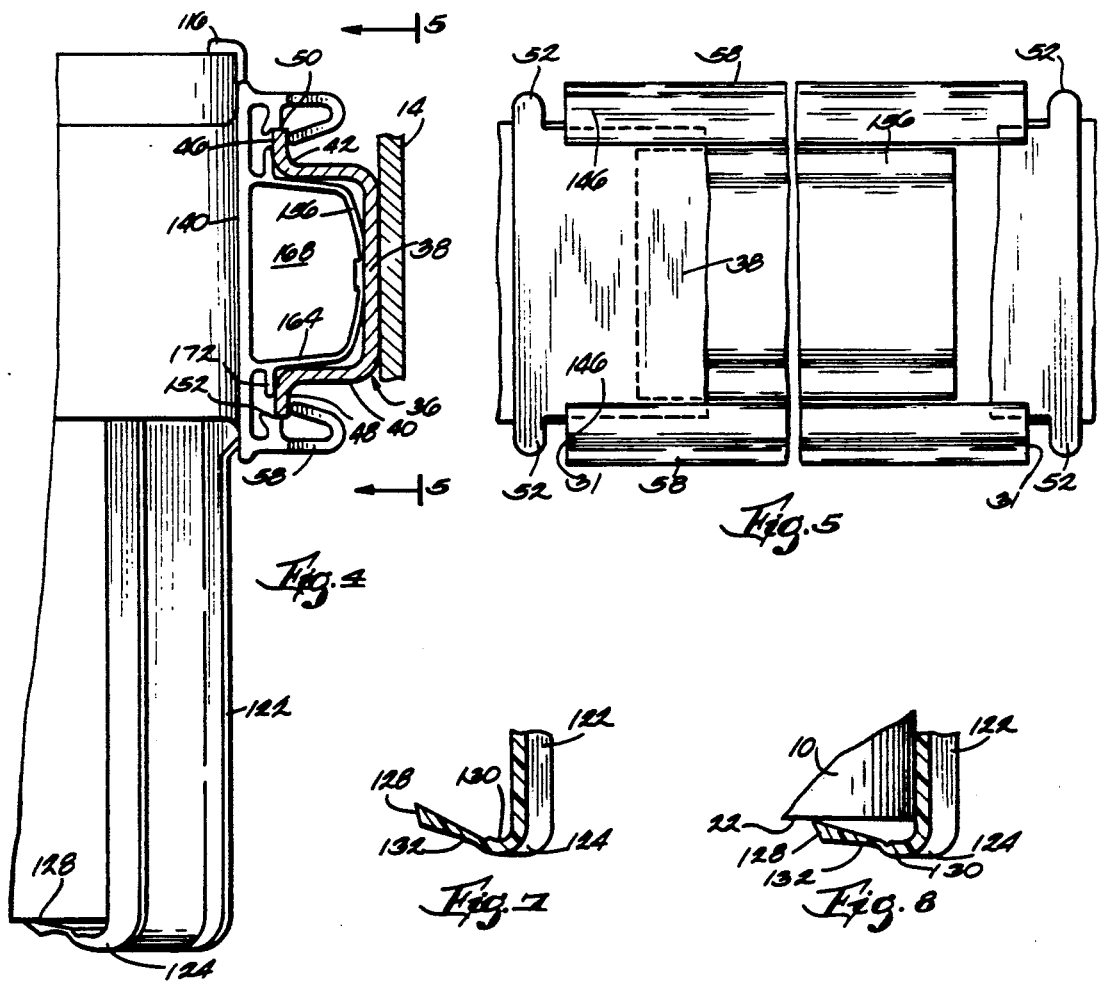

MOUNTING BRACKET FOR A GENERALLY CYLINDRICAL ARTICLE

BACKGROUND OF THE INVENTION

1. Technical Field

This invention relates generally to a mounting bracket construction, and particularly to a mounting bracket for a fuel vapor canister for an automobile. However, the concepts embodied in the mounting bracket disclosed herein may have other uses.

2. Relation to the Prior Art

Numerous constructions and arrangements for mounting brackets have been proposed in the past. Generally, when a particular article or group of articles are to be mounted, a specific bracket construction is provided. Expansion of the intended or projected use of the bracket usually leads to the incorporation of different features in the basic bracket, each having its own set of design considerations. For example, in the case of fuel vapor canisters used on motor vehicles, the canisters may have different axial lengths and different circumferences due to the vagaries of their manufacture, yet n!ay have to be accommodated by a single bracket design. In the past, the design of a fuel vapor canister has usually led to a relatively complex, multi-part bracket. Such multi-part brackets have the usual problems of difficulty of installation, lack of ability to easily accommodate different size articles, and can require a relatively large parts inventory.

In addition, the mounting bracket must be designed to securely mount the associated fuel vapor canister on the vehicle. Due to the nature of such an application, multi-part brackets are also susceptible to vibration, which can cause loosening of the several parts which in turn can result in undesirable noise and fatigue which can lead to failure. Each of these characteristics of multi-part mounting brackets are negatives as to cost and ease of use of the bracket.

SUMMARY OF THE INVENTION

Among the general objects of this invention are to provide a mounting bracket construction which can accommodate a relatively wide range of sizes for any given article, is easy to install and replace, and which can readily receive the article to be supported.

An additional object of this invention is to achieve &he aforementioned objectives in a construction which can be fabricated in a relatively simple and cost effective manner.

A further specific object of this invention is to provide a mounting bracket having a unitary construction and having the capacity to securely hold articles having different sizes.

For the achievement of these and other objectives, this invention provides a clamp having a unitary construction which includes a band and a ratchet for tightening the band around the periphery of the canister to tightly hold the canister. Because of the ratchet mechanism, the band can be tightened sufficiently to accommodate cylinders having various circumferences. The clamp also provides a set of resiliently flexible stops for engaging the ends of the canister. The canister can be placed between the stops and held securely between the stops because the spring force of the stops biases the stops axially toward each other. Because of the inherent bias of the stops, canisters having varying axial lengths can be held between the stops. The clamp also provides a mounting bracket adapted to provide a snap-fit engagement with a member attached to the vehicle frame. The mounting bracket securely connects the clamp to the vehicle and also includes a construction incorporating members having an inherent bias so that the mounting bracket is deformed when engaged with the member so as to provide a tight fit and to prevent vibration.

Other features and advantages of the invention will become apparent to those skilled in the art upon review of the following detailed description, claims and drawings.

DETAILED DESCRIPTION OF THE DRAWINGS

FIG. 1 is a perspective view of a clamp illustrating various features of the invention.

FIG. 2 is a side elevational view of the clamp illustrated in FIG. 1 with parts removed for illustration.

FIG. 3 is a plan view from above of the clamp illustrated in FIG. 2.

FIG. 4 is a side elevational view of the clamp shown in FIG. 3 taken along line 4—4 and mounted on a bracket.

FIG. 5 is a rear elevational view of the clamp illustrated in FIG. 4 and taken along line 5—5.

FIG. 6 is a cross-sectional view of the clamp illustrated in FIG. 2 and taken along line 6—6.

FIG. 7 is an enlarged view of a portion of the clamp illustrated in FIG. 1.

FIG. 8 is a view similar to FIG. 7 illustrating the portion of the clamp in a second position.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limited.

DESCRIPTION OF THE PREFERRED EMBODIMENT

The particular environment in which the invention will be discussed is illustrated in FIG. 1. A fuel vapor canister 10 is supported by a clamp 12 from a vehicle bulkhead (not shown). The canister 10 is generally cylindrical, is generally elongated, and usually carries the necessary fittings (not shown) through which fuel vapors can pass to and from the canister 10 as required. It will be appreciated that the construction and function of canister 10 is conventional and need not be described in significant detail for a proper understanding of this invention. Accordingly, no such detailed description will be made herein.

Reference will now be made to the clamp 12. Its primary function is to securely and releasably support the canister 10. To this end, the clamp 12 should grasp the canister 10 both axially and circumferentially, and should securely engage with mounting parts, such as a rail or frame 14, attached to the vehicle.

In general terms, the clamp 12 grasps the canister 10 axially by means of a plurality of stops 16. The stops 16 engage oppositely facing, axially spaced (relative to the longitudinal axis of the canister) surfaces. As illustrated, these are the top 20 and bottom 22 surfaces of the canister 10. The stops 16 are resiliently flexible and have an inherent spring force so that the stops and can be biased against the spring force to engage the top and bottom surfaces 20, 22 of the canister. The engagement of the stops 16 with the canister 10 holds the canister securely and against axial movement.

The clamp 12 grasps the canister 10 circumferentially by a band 24. The band 24 is capable of encircling the canister through a first, flexible band portion 26 and a second, shorter band portion 28, both of which are connected to and extend from a rigid base 30. A circumferential locking mechanism 32 releasably joins the otherwise free ends of band portions 26 and 28.

The base 30 has opposite ends 31 and is provided with a mounting arrangement 34 which provides a secure snap-fit with a mounting plate 36. As best shown in FIG. 4, the mounting plate 36 has opposite ends 37 and a generally U-shaped cross-section which is defined by a generally flat bottom wall 38 and a pair of side walls 40 which extend laterally therefrom. Each sidewall 40 has a bight portion 42 which bends outwardly therefrom to form a flange or ear 44. Each flange 44 defines opposite upper and lower surfaces 46, 48 and an end surface 50. As illustrated in FIG. 5, and for reasons discussed fully below, the mounting plate 36 also includes a pair of tabs 52 at the opposite ends 37 of the mounting plate 36 and spaced from the flanges 44. The mounting plate 36 can be rigidly fixed to the vehicle's frame 14 by (FIG. 1) a suitable fastener 54, or may be welded to the frame 14. The snap fit between the mounting arrangement 34 and the mounting plate 36 is provided (FIG. 2) by a first, web 56 and a pair of legs 58 which extend from the web 56 and which engage the mounting plate. The web 56 and legs 58 are generally spring-like to exhibit an inherent bias which, when engaged with the mounting plate 36, hold the interengaging surfaces thereof tightly together.

More particularly, the clamp 12 provides radial holding means 62 for engaging the circumference of the canister 10, axial holding means 64 for engaging the canister 10 at spaced-apart locations, and mounting means 66 for connecting the radial holding means and axial holding means to the mounting plate 36.

The radial holding means 62 includes (FIG. 3) the above-mentioned band 24, the first, separable portion 26 and the second, separable portion 28, and includes releasable means 68 for connecting the first and second separable portions 26, 28 to define a generally annular ring 70. The first separable portion 26 has a first end 72 which is connected to one of the opposite ends 31 of the base 30 and a second or free end 74. A generally circular intermediate portion 76 extends between the first and second ends 72, 74 of the first separable portion 26 of the band 24. The second separable portion 28 of the band 24 includes a first end 78 which is connected to the other opposite end 31 of the base 30 and a second or free end 80. In the illustrated embodiment, the second portion 28 of the band 24 is generally shorter than the first portion 26.

The radial holding means also (FIG. 3) includes a pair of springs 81 which are disposed on the first 26 and second 28 portions of the band 24 and which extend inwardly of the annular ring 70. In the illustrated arrangement, the springs 81 are located adjacent the ends 31 of the base 30 so as to engage the periphery of the canister 10 and bias the canister 10 toward the intermediate, generally circular portion 76 of the band 24. Thus the spring 81 disposed on the second portion 28 of the band 24 biases the canister 10 toward the first portion 26 of the band.

The releasable means 68 for connecting the separable portions 26, 28 of the band 24 includes the aforementioned lock 32 which comprises a body 82 and a clip 84 which are formed on the respective free ends 74, 80 of the first and second separable portions 26, 28 and which are interengageable so that the ends 74, 80 of the band 24 overlap. The clip 84, which is located on the second portion 28 of the band 24, defines a first set of ratchet teeth 86 which extend generally axially on the outer surface 88 of the band 24, and a relatively smooth clip surface 90 which is in opposed facing relation to the first set of ratchet teeth 86. The clip surface 90 extends from the band 24 radially outwardly and is spaced radially from the first set of ratchet teeth 86 in a normal, undeflected position so that the clip surface 90 is spaced at a predetermined distance from the first set of ratchet teeth 86. Preferably, the clip surface 90 has an inherent bias or spring force so that the clip surface 90 can be deflected away from the normal position against the spring force and will tend to return to the normal position. In order to maintain the inherent bias or spring force of the clip surface 90, the clip 84 also includes (FIG. 6) a stiffening rib 92 which extends along the outer surface of the clip 84. As shown in FIG. 3, the first set of teeth 86 and the clip surface 90 define therebetween a generally U-shaped space 94 which extends generally circumferentially around a portion of the band.

The body 82, which is located at the free end 74 of the first portion 26 of the band 24, defines a second set of ratchet teeth 96 which extend generally axially on the inner surface 98 of the band 24. The body 82 also defines an engagement surface 100 on the outside of the band 88 and a generally rounded end 102. The body 82 has a width between the second set of ratchet teeth 96 and the engagement surface 100 which is greater than the predetermined distance so that, when the rounded end 102 of the body 82 moves into the space 94 defined by the clip 84, the engagement surface 100 moves the clip surface 90 away from the first set of ratchet teeth 86. As the body 82 moves farther into the space 94, the two sets of ratchet teeth 86, 96 engage so the free ends 74, 80 of the band 24 can move relative to each other in a direction to reduce the circumference of the ring 70 and to apply a clamping force on the periphery of the canister 10, but not in a direction to enlarge the ring 70. Because of the inherent spring force of the clip 84, the clip surface 90 tends to bias the first and second sets of ratchet teeth 86, 96 into engagement and to maintain the engagement of the sets of teeth 86, 96 when the body 82 and the clip 84 are interengaged.

As shown in FIGS. 3 and 6, the body 82 has extending axially therethrough, an opening or release hole 104 providing a surface which is adapted to engage a screwdriver or a like implement which can be used to pry the first 86 and second 96 sets of ratchet teeth apart in order to disengage the body 82 and the clip member 84. The body 82 also includes a release tab 106 which extends from an edge of the body 82 and which provides another surface against which releasing forces can be applied to disengage the sets 86, 96 of ratchet teeth. Thus, the clamp 12 provides releasable means 68 for expanding and contracting the ring 70 so that the band 24 is operable to apply a predetermined clamping force about the periphery of the canister 10.

The releasable means 68 for joining the free ends 74, 80 of the separable portions 26, 28 also includes means 108 for preventing disengagement of the engaged sets of ratchet teeth 86, 96 in an axial direction. As shown in FIG. 6, the means 108 for preventing axial disengagement of the releasable means 68 includes, on the clip member 84, a first alignment tab 110 which extends outwardly from the second portion 28 of the band 24. The means 108 for preventing axial disengagement of the clip 184 and the body 82 also includes, on: the body 82, a second alignment tab 112 which extends radially outwardly from the body 82. When the clip 84 and the body 82 are moved together so that the first 86 and second 96 sets of ratchet teeth are engaged, the first alignment tab 110 engages the bottom edge of the body 82 to prevent movement of the body 82 relative to the clip 84, and to the band 24, in an axial direction which is downward in FIG. 6. The second alignment tab 112 prevents movement of the body 82 relative to the clip 84 in the axial direction which is upward in FIG. 6 by engaging the lower edge of the clip 84.

The above-mentioned axial holding means 64 for engaging the article at spaced-apart locations includes the plurality of stops 16 which comprises a first set of stops 114 which engage the top 20 of the canister 10 and which is connected to the upper edge of the band 24. In the illustrated embodiment, the first set of stops 114 includes (FIG. 3) a pair of stops 116 which are arranged to be mutually diametrically opposed about the annular ring 70. The plurality of stops 16 also comprises a second set of stops 118 which are spaced axially from the first set of stops 114 and which engage the bottom 22 of the canister 10. As shown in FIG. 3, the illustrated embodiment includes two stops 120 which engage the bottom 22 of the canister 10. A pair of legs 122 extend (FIGS. 2, 4) axially downwardly between the band 24 and each of the second set 118 of stops. Each of the legs 122 has a lower portion 124 which extends radially inwardly of the band 24 and which terminates in the form of a tab 126. Each tab 126 has a free end 128, and an end 130 which is integrally formed with the inwardly turned portion 124, and an intermediate portion 132 which has a reduced cross-sectional configuration.

As shown in FIG. 7, each tab 126 is ordinarily disposed in a first position wherein the free end 128 of the tab 126 angles generally upwardly toward the first set 114 of stops. The reduced cross-sectional area of the intermediate portion 132 provides an inherent bias or spring force to the tabs 126 such that the tabs 126 are generally resiliently flexible and are generally movable in a direction away from the first set 114 of stops. When the canister 10 is placed in engagement with the second set 118 of stops, as shown in FIG. 8, the tabs 126 are deflected downwardly toward a second position against the spring force. Thus, the canister 10 is held between the first 114 and second set 118 of stops and is biased toward the first set 114 of stops by the inherent spring force of the second set 118 of stops.

The above-mentioned mounting arrangement 34 includes (FIG. 2) the mounting means 66 for connecting the axial holding means 64 and the radial holding means 66 to the mounting plate 36.

The mounting means 66 includes a mounting bracket 140 which extends from the base 30 of the clamp 12 in a direction opposite the band 24 and which is adapted to releasably engage the mounting plate 36. The mounting bracket 140 (FIG. 2) has a generally U-shaped configuration and, as mentioned above, is adapted to provide a snap-fit with the mounting plate 36. The mounting bracket 140 includes the above-mentioned inverted or first web 56, which is defined by the base 30 of the clamp 12 and the pair of spaced-apart legs 58 which extend generally laterally therefrom. The pair of legs 58 and the first web 56 thus define (FIG. 2) a U-shaped space 142 therebetween. As shown in FIG. 4, and for reasons explained below, the pair of legs 58 on the mounting bracket 140 are generally spaced apart a greater distance than the pair of side walls 40 on the mounting plate 36.

The mounting bracket 140 also includes (FIG. 2) means 144 for receiving the mounting plate 36 between the pair of legs 58 and for engaging the flanges 44 on the mounting plate 36. In order to receive the mounting plate 36 therebetween and for engaging the flanges 44, each of the legs 58 includes a hook portion 146 which turns 180° towards the first web 56 and which defines a space which opens toward the first web. Each hook portion 146 terminates in the end 148 of the leg 58 and has an inherent spring force which tends to bias the hook portion 146 into a reference position.

Each of the legs 58 also includes a substantially rigid shoulder 150 which has a free end 152 which extends laterally from the leg 58 and inwardly of the U-shaped space 142. As best shown in FIG. 2, each shoulder 150 has a generally rounded notch 154 at the free end 154 of the shoulder 150 and, as more fully discussed below, is adapted to engage (FIG. 4) the respective end surfaces 50 of the flanges 44 of the mounting plate 36 so that the ends 50 of the flanges 44 can be seated in the notch 154 when the mounting plate 36 is snapped into engagement with the mounting bracket 140. Preferably, the ends 152 of the shoulders 150 extend inwardly of the U-shaped space 142, but for reasons discussed below, do not extend beyond the ends 148 of the legs 58.

The mounting bracket 140 also includes an inverted channel 156 which extends laterally from the first web 56 and into the U-shaped space 142 between the pair of legs 58. The channel 156 divides the mounting bracket 140 and the U-shaped space 142 into two portions or sides which, in FIG. 2, are the upper 160 and lower 162 sides. When the mounting bracket 140 and the mounting plate 36 are assembled (FIG. 4), the channel 156 nests with the side walls 40 and bottom wall 38 and is substantially housed by the mounting plate 36. The channel 156 (FIG. 2) includes a pair of walls 164 which, at one end, are joined to the first web 56 and which extend laterally from the first web 56. The channel 156 also includes a second web 166 which extends between the other ends of the walls 164 and which is slightly bowed outwardly. Together, the second web 166, the wall members 164, and the first web 58 define an elongated space 168 which extends generally tangentially to the circumference of the canister 10. The wall members 164 and the second web 166 are preferably relatively thin and can, for reasons discussed below, be deflected so that the cross-section of the elongated space 168 can be deformed.

A substantially rigid, cantilevered shelf 170 extends outwardly from each wall member 164 at a location generally opposed to the shoulders 150 on the legs 58. The shelves 170 extend from a respective wall 164 and have a free end 172 which is closely-spaced to the notched end 152 of a respective shoulder 150. While each shelf 170 extends from a wall 164 and is closely spaced to a shoulder 150, for reasons discussed below, the shelf 170 preferably does not extend past the end of the respective hooked portion 146.

The mounting bracket 140, including the pair of legs 58, the shoulders 150, the channel 156 and the shelves 170 cooperate to provide a snap-fit for the mounting plate 36. In order to assemble the mounting bracket 140 and the mounting plate 36, one side wall 40 of the mounting plate 36 can be engaged with one side (160 or 162) of the mounting bracket 140. The end surface 50 of the flange 44 on the one side wall 40 can be engaged with the notched end 152 of the shoulder 150, and the bight portion 42 and upper surface of the flange 46 can be moved into engagement with the shelf 170 on the one side of the mounting bracket 140 and with the wall 164 of the channel 156 from which the shelf 170 extends. Rotation of the mounting bracket 140 to move the mounting plate 36 into engagement with the other side (160 or 162) of the mounting bracket 140 moves the lower surface 48 of the flange 44 into engagement with the end 148 of the hook portion 146 and moves the bottom wall 38 of the mounting plate 36 into engagement with the outer surface of the second web 166. As the flange 44 of the mounting plate 36 moves into engagement with the leg 58 of the mounting bracket 140, the hooked portion 146 is moved outwardly of the U-shaped space 142 to allow the flange 44 to move into engagement with the shelf 170 and with the notched end 152 of the shoulder 150. As the flange 44 moves past the end 148 of the hooked portion 146, the hooked portion 146 snaps back into its normal position and to engage the lower surface 48 of the flange 44.

Because, as mentioned above, the cantilevered shelf 170 does not extend beyond the hook portion 146 engagement of the hook portion 146 with the lower surface 48 of the flange 44 biases the upper surface 46 of the flange 44 against the shelf 170, and deflects the cantilevered shelf 170 slightly toward the first web 56. Also, as the mounting plate 36 moves into engagement with the channel 156, the channel 156 can deflect in order to engage the side walls 40 and the bottom wall 38 of the mounting plate 36. More specifically, because the second web 166 is bowed outwardly, when the mounting plate 36 is snapped into engagement with the mounting bracket 140, the second web 166 is moved by the bottom wall 38 of the mounting plate 36 toward the first web 56 and, in turn, deflects the walls 164 of the channel 156 outwardly and into engagement with the side walls 40 of the mounting plate 36.

Thus, the mounting bracket 140 prevents movement of the radial holding means 62 and the axial holding means 64 in a radial and axial direction. The notched end 152 of the shoulder 150, the shelf 170, and the end 148 of the hook portion 146 prevent movement of the clamp 12 radially, or in a left to right direction in FIG. 4. The notched shoulders 152 and the walls 164 of the channel 156 prevent axial movement of the clamp 12, or movement in up or down direction in FIG. 4. The tabs 52 on the ends 37 of the mounting plate 36 prevent tangential movement of the clamp 12 relative to the frame 14, or movement of the clamp 12 in a left to right direction in FIG. 5, by engaging the opposite ends 31 of the base 30 of the clamp 12.

The clamp 12 also includes means for mounting ancillary bracketry or shields (not shown) thereon. In the illustrated embodiment, the clamp 12 provides (FIGS. 1 and 3) a pair of mounting holes 174 which extend through a portion of the base 30 and which are arranged to provide a convenient surface for mounting a shield or the like thereon.

Preferably, the clamp is integrally formed of molded nylon or a similar material into the above-described, unitary construction. The entire unit, i.e. the circumferential holding means 62 including the interengaging parts, the axial stops 16 including the related structural connections, and the mounting means 66 for engagement with the vehicle-supported bracket 36, are molded into a one-piece structure.

Various features of the invention are set forth in the following claims.

I claim:

1. A clamp for holding a generally elongated, generally cylindrical article, said clamp comprising
   radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article,
   axial holding means for engaging the article at axially spaced-apart surfaces, said axial holding means including a plurality of stops spaced axially relative to each other and adapted to engage said article at the space-apart surfaces of the article so that the article is held in said clamp against movement in an axial direction relative to said band and
   mounting means for connecting said axial holding means and said radial holding means to a mounting plate, said mounting means including
   a web fixed to said band,
   spaced apart legs projecting laterally from said web to define a generally U-shaped body,
   means connected to each of said legs for selectively engaging the mounting plate including a pair of spaced, opposed surfaces extending generally laterally from a respective one of said legs and having an inherent bias so that said clamp can be supported from the mounting bracket by engaging the mounting plate between said pairs of opposed surfaces so that the mounting plate is clamped therebetween,
   a second web spaced from said first web and extending between said spaced apart legs, and
   said second web has an inherent bias so that said bracket can engage said second web to displace said second web against said bias and thereby bias said second web and said second legs when said bracket is engaged between said opposed surfaces.

2. A clamp as set forth in claim 1 wherein said plurality of stops includes a first set of stops extending radially inwardly of said band and a second set of stops spaced axially of said first set of stops, each of said second set of stops having a first position and an inherent spring force for resiliently biasing each of said second set toward said first position, said second set of steps being arranged so that movement thereof from said first position is generally away from said first set and so that said first and second sets can respectively engage spaced-apart locations on the article and can accommodate articles having different axial lengths.

3. A clamp as set forth in claim 2 wherein said first of said first and second sets of stops is connected to said band, and including means supporting said second set of stops spaced axially of said band and including legs extending axially from said band and terminating in radially inwardly projecting tabs which define said second set of stops.

4. A clamp as set forth in claim 1 wherein said releasable means includes, on one of said separable portions, a clip defining a first set of ratchet teeth and a surface in opposed-facing relation to said teeth and having a normal position spaced from said teeth a predetermined distance, said surface having an inherent spring force so that said surface is movable away from said normal position and away from said ratchet teeth against said spring force, and, on another of said separable portions, a body movable into engagement with said clip and defining a second set of ratchet teeth arranged to engage said first set of teeth on said clip, said body having a width greater than said predetermined distance so that, when said body is engaged with said clip, said surface on said clip is biased away from said first set of ratchet teeth and said sets of ratchet teeth are biased into engagement.

5. A clamp for holding a generally elongated, generally cylindrical article, said clamp comprising radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article, axial holding means for engaging the article at axially spaced-apart surfaces, said axial holding means including a plurality of stops spaced axially relative to each other and adapted to engage said article at the spaced-apart surfaces of the article so that the article is held in said clamp against movement in an axial direction relative to said band, mounting means for connecting said axial holding means and said radial holding means to a mounting plate, said mounting means including a web fixed to said band, spaced apart legs projecting laterally from said web to define a generally U-shaped body, and means connected to each of said legs for selectively engaging the mounting plate including a pair of spaced, opposed surfaces extending generally laterally from a respective one of said legs and having an inherent bias so that said clamp can be supported from the mounting bracket by engaging the mounting plate between said pairs of opposed surfaces so that the mounting plate is clamped therebetween, said plurality of stops including a first set of stops extending radially inwardly of said band and a second set of stops spaced axially of said first set of stops, each of said second set of stops having a first position and an inherent spring force for resiliently biasing each of said second set toward said first position, said second set of steps being arranged so that movement thereof from said first position is generally away from said first set and so that said first and second sets can respectively engage spaced-apart locations on the article and can accommodate articles having different axial lengths, said first of said first and second sets of stops being connected to said band, means supporting said second set of stops spaced axially of said band and including legs extending axially from said band and terminating in radially inwardly projecting tabs which define said second set of stops, and said tabs have a free end disposed at an angle projecting generally toward said first set of stops and a reduced cross section intermediate said free end and said respective leg, said reduced section providing said spring force.

6. A clamp for holding a generally elongated, generally cylindrical article, said clamp comprising radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article, axial holding means for engaging the article at axially spaced-apart surfaces, said axial holding means including a plurality of stops spaced axially relative to each other and adapted to engage said article at the spaced-apart surfaces of the article so that the article is held in said clamp against movement in an axial direction relative to said band, mounting means for connecting said axial holding means and said radial holding means to a mounting plate, said mounting means including a web fixed to said band, spaced apart legs projecting laterally from said web to define a generally U-shaped body, and means connected to each of said legs for selectively engaging the mounting plate including a pair of spaced, opposed surfaces extending generally laterally from a respective one of said legs and having an inherent bias so that said clamp can be supported from the mounting bracket by engaging the mounting plate between said pairs of opposed surfaces so that the mounting plate is clamped therebetween, said releasable means including, on one of said separable portions, a clip defining a first set of ratchet teeth and a surface in opposed-facing relation to said teeth and having a normal position spaced from said teeth a predetermined distance, said surface having an inherent spring force so that said surface is movable away from said normal position and away from said ratchet teeth against said spring force, a body on another of said separable portions and movable into engagement with said clip and defining a second set of ratchet teeth arranged to engage said first set of teeth on said clip, said body having a width greater than said predetermined distance so that, when said body is engaged with said clip, said surface on said clip is biased away from said first set of ratchet teeth and said sets of ratchet teeth are biased into engagement said first and second sets of ratchet teeth extending radially with respect to said band, and including alignment means associated with said releasable means for holding said engaged sets of teeth against disengagement, said alignment means including projections disposed on one of said clip and said body and engaging an edge of the other of said clip and said body when said first and second sets of ratchet teeth are engaged.

7. A clamp as set forth in claim 6 wherein said alignment means includes means for preventing disengagement of said engaged sets of ratchet teeth in an axial direction, said means for preventing disengagement of said ratchet teeth including first a projection extending radially from said clip and being engageable with an edge of said body and including a second projection extending radially from said body and being engageable with an edge of said clip when said first and second sets of ratchet teeth are engaged.

8. A clamp for holding a generally elongated, generally cylindrical article, said clamp comprising
radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article,
axial holding means for engaging the article at axially spaced-apart surfaces, said axial holding means including a plurality of stops spaced axially relative to each other and adapted to engage said article at spaced-apart surfaces of the article so that the article is held in said clamp against movement in an axial direction relative to said band,
said releasable means including means for moving said separable portions relative to each other and for varying the circumference of said annular ring, and
said axial holding means including a first set of stops defining a plurality of laterally extending surfaces, a second set of stops defining a second set of laterally extending surfaces, and means for biasing said second set of surfaces toward said first set of surfaces when said article is engaged with said stops.

9. A clamp as set forth in claim 8 wherein said releasable means includes, on one of said separable portions, a clip having a first set of ratchet teeth and a surface spaced from said first set of teeth and being in opposed-facing relation to said first set of teeth, and including on said other of said separable portions, a body movable into engagement with said clip and including a second set of ratchet teeth arranged to engage said first set of teeth, and means for biasing said first and second sets of teeth into engagement when said body and said surface are engaged.

10. A clamp as set forth in claim 9 wherein said surface is spaced from said first set of teeth a predetermined distance, and wherein said body has a width greater than said predetermined distance.

11. A clamp for holding a generally elongated, generally cylindrical article, said clamp comprising
radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article,
axial holding means for engaging the article at axially spaced-apart surfaces, said axial holding means including a plurality of stops spaced axially relative to each other and adapted to engage said article at spaced-apart surfaces of the article so that the article is held in said clamp against movement in an axial direction relative to said band,
said axial holding means including a first set of stops defining a plurality of laterally extending surfaces, a second set of stops defining a second set of laterally extending surfaces, and means for biasing said second set of surface toward said first set of surfaces when said article is engaged with said stops, and
said biasing means including, on said second set of stops, a radially inwardly extending portion defining a tab having a free end and an intermediate portion having a reduced cross-section, said radially inwardly portion being generally angled upwardly toward said first set of stops and being generally flexible in a direction away from said first set of stops, said biasing means acting on said stop to bias said stop toward said first set of stops.

12. A clamp for holding a generally elongated, generally cylindrical article, said clamp comprising
radial holding means for engaging the circumference of the article, said radial holding means including a band having separable portions and releasable means for connecting said separable portions to define a generally annular ring, said releasable means providing means for selectively expanding and contracting said annular ring so that said band is operable to apply a preselected clamping force about the periphery of the article,
axial holding means for engaging the article at axially spaced-apart surfaces, said axial holding means including a plurality of stops spaced axially relative to each other and adapted to engage said article at spaced-apart surfaces of the article so that the article is held in said clamp against movement in an axial direction relative to said band,
said radial holding means includes, a spring engaged with the article for biasing the article toward one of said separable portions, and
said spring includes a first portion fixed to said one separable portion, and a second portion fixed to said one separable portion, said first and second portions extending generally circumferentially around the periphery of the article.

13. A clamp for holding a generally elongated, generally cylindrical article, said clamp comprising
a bracket, and
mounting means for releasably engaging the bracket, said mounting means including
a first web,
spaced apart legs projecting laterally from said first web to define a generally "U"-shaped body
means connected to each of said legs for selectively engaging said bracket, said means including a pair of spaced, opposed surfaces extending generally laterally from a respective one of said legs and having an inherent bias so that said clamp can be supported by said bracket by engaging said bracket between said pairs of opposed surfaces the bracket inserted between said pairs of spaced surfaces is clamped therebetween,
said mounting means also including a "U"-shaped body having a second web, and a second pair of legs extending between said second web and said first web inwardly of said first pair of legs, and said second web has an inherent bias so that said bracket can engage said second web to displace said second web against said bias and thereby to bias said second web and said second legs when said bracket is engaged between said opposed surfaces.

14. A clamp for holding a generally elongated, generally cylindrical article, said clamp comprising a bracket, and mounting means for releasably engaging the bracket, said mounting means including a first web, spaced apart legs projecting laterally from said first web to define a generally "U"-shaped body, means connected to each of said legs for selectively engaging said bracket, said means including a pair of spaced, opposed surfaces extending generally laterally from each of said legs and having an inherent bias so that said clamp can be supported by said bracket by engaging said bracket between said pairs of opposed surfaces the bracket inserted between said pairs of spaced surfaces is clamped therebetween, and said mounting means including, on each leg, a first radially inwardly extending projection and a second radially extending projection spaced apart from said first radially extending projection.

15. A clamp as set forth in claim 14 wherein each leg includes a hook portion having an end terminating in said second set of surfaces and defining a "U"-shaped opening toward said web.

16. A clamp as set forth in claim 15 wherein said mounting bracket includes a "U"-shaped body having a second web, and a second pair of legs extending between said second web and said first web inwardly of said first pair of legs.

17. A clamp as set forth in claim 16 wherein said second web is bowed.

18. A clamp as set forth in claim 17 wherein said second web has an inherent bias so that said bracket can engage said second web to bias said second web and said second legs when said bracket is engaged between said opposed surfaces.

19. A clamp as set forth in claim 18 wherein said mounting means includes a shelf extending outwardly from said second pair of legs in general alignment with said first surfaces.

20. A clamp for holding a generally cylindrical article, said clamp comprising a band having separable portions and releasable means for connecting said releasable portions to define a generally annular ring, said releasable means providing for relative movement of said separable portions relative to each other to selectively expand and contract said annular ring so that said band is operable to apply an adjustable clamping force about the periphery of the article, said releasable means including on one of said separable portions, a clip defining a first set of ratchet teeth and a surface in opposed facing relation to said teeth and spaced from said teeth a predetermined distance, said surface having an inherent spring force so that said surface is movable away from said ratchet teeth against said spring force, and, on another of said separable portions, a body movable into engagement with said clip and defining a second set of ratchet teeth arranged to engage said first set of teeth and said body having a width greater than said predetermined distance so that, when said body is engaged with said clip, said surface on said clip is biased away from said first set of ratchet teeth and said sets of ratchet teeth are biased into engagement, and means associated with said releasable means for holding said engaged sets of teeth against disengagement in an axial direction, said means including projections disposed on one of said clip and said body and engaging an edge of the other of said clip and said body when said ratchet teeth are engaged.

21. A clamp as set forth in claim 20 wherein said means for holding said sets of teeth against disengagement includes means for receiving a disengaging force including an opening in said body.

* * * * *